Patented Sept. 7, 1948

2,449,036

UNITED STATES PATENT OFFICE 2,449,036

MANUFACTURE OF PRIMARY AMINES

Maximilien Grunfeld, Lyon, France; vested in the Attorney General of the United States No Drawing. Application February 8, 1941, Serial No. 378,061. In Great Britain November 2, 1939

Sections 3 and 14, Public Law 690, August 8, 1946
Patent expires November 2, 1959

8 Claims. (Cl. 260—583)

The present invention relates to a process for the manufacture of primary amines by the catalytic hydrogenation of the corresponding nitriles in the liquid phase. It is already known that the catalytic hydrogenation of the nitriles does not generally lead to the production of the corresponding primary amines exclusively, as the final reaction product contains not only the primary amine but also secondary and tertiary amines. In order to avoid the formation of secondary and tertiary bases, that is to say in order to induce the reaction to take place in the desired sense of the formation of primary amines to a very preponderant extent, various means have been proposed, for example it has been proposed amongst other methods to carry out the hydrogenation of the nitriles in the presence of ammonia, or in the presence of substances capable of liberating ammonia, and it has also been proposed to use as hydrogenation catalysts substances containing cobalt as an essential constituent, or a combination of the above mentioned methods has been suggested.

The use of ammonia is attended with several inconveniences particularly owing to the fact that it is a gas under the ordinary conditions of temperature and pressure. Its use, therefore, necessitates the manipulation of the type of vessel generally used for the handling of compressed or liquefied gases. Furthermore, in the atmosphere of the reaction apparatus the hydrogen is thereby diluted with ammonia, which latter increases the total pressure in the apparatus and therefore for a given pressure of hydrogen there is the necessity of working in actual practice under a much higher pressure, owing to the presence of the ammonia. This therefore necessitates the use of vessels capable of standing a much higher pressure than would be required if no ammonia were present. In the known processes of this kind the quantity of ammonia used is often very large, sometimes greater than the quantity of the nitrile submitted to hydrogenation, which is a great disadvantage from the point of view of economical working. It is true that processes can be adopted for recovering the ammonia used, but this necessarily leads to complications.

The use of catalysts containing cobalt as an essential constituent has also been previously known for causing the reduction of the nitriles to take place chiefly in the direction of the formation of primary amines. However, it is a fact that it is only by combining the use of cobalt catalysts with the method of working in the presence of ammonia which enables really good yields to be obtained, so that to obtain good yields of primary amines from the corresponding nitriles it has practically always been necessary to use ammonia with all the resultant drawbacks.

According to the present invention it has been found that the hydrogenation of nitriles in the liquid phase in the presence of the usual catalysts and, in particular, in the presence of nickel or cobalt catalysts, can be caused to lead to the production almost exclusively of primary amines even when ammonia is not employed, provided that the catalytic reduction is carried out in presence of a strong base soluble in water. As examples of such substances there may be mentioned barium hydroxide, the alkali bases such as sodium, potassium or lithium hydroxides, the quaternary ammonium bases such as tetramethyl-ammonium hydroxide, methyl-triethyl-ammonium hydroxide, and the like. The proportion of base to be used can vary within very wide limits, such as for example from 0.1 to 10% or more of the weight of the nitrile. Generally a proportion of 5% or less is sufficient to bring about the desired effect. If desired, the base can conveniently be introduced into the reaction medium in the form of an aqueous solution as, for example, in the case of caustic soda or caustic potash in the form of commercial lyes.

The proportion of catalyst used can vary between large limits. Good results are obtained by using a quantity of between 1% and 10% of the weight of nitrile treated. This quantity can be increased without any drawback, but in general a proportion of about 5% is most suitable. It has further been shown according to the present invention that the catalyst after use has not appreciably lost its activity and can be re-used a very large number of times. A series of twenty successive reductions has been carried out using 5% of the catalyst and using it again without there being observed any appreciable difference in activity between the first and the twentieth reduction. By using slightly greater quantities of catalyst a very large number of operations can be carried out without the need of adding any fresh catalyst, which enables the consumption of catalyst to be reduced to insignificant amounts. This very small consumption of catalyst permits the operation to be conducted in an economical manner by causing the nitrile to circulate over a fixed catalyst.

The hydrogenation of the nitrile can also be carried out by simple addition of the catalyst and the base. In certain cases in order to render the reaction liquid conveniently mobile, a solution of the nitrile in an inert solvent such as ethyl alcohol can be used.

The temperature to be used depends to a certain extent on the particular nitrile to be treated; it is generally below 100° C. In those cases where the nitrile is capable of being hydrogenated in various ways, as for example when the molecule contains an ethylenic double bond, the temperature should be chosen according to which amine it is desired to obtain, namely whether it is desired to obtain a saturated or an unsaturated amine. For example, in the case of oleic nitrile, by affecting hydrogenation at a temperature above 80° C. there is obtained chiefly the oleylamine by transformation of the CN group into $CH_2NH_2$, while by working at a temperature below 60° C. the principal product of the reaction is stearylamine or octadecylamine resulting from the hydrogenation of the nitrile group and the ethylenic double bond at the same time.

The hydrogenation of the nitriles in the presence of strong bases is very easily carried out and it is not necessary to use very high pressures as was the case in most of the previously known processes. A pressure of less than 50 atmospheres is usually suitable. It has further been found according to the present invention that the hydrogenation of the nitriles under the conditions here described is more rapid than in the absence of the base, which is again an advantage.

The invention is applicable quite generally to all the nitriles and is particularly suitable to the nitriles corresponding to the higher fatty acids, such as the nitriles of lauric acid, palmitic acid, oleic acid, stearic acid and the like, so as to obtain dodecylamine, cetylamine, oleylamine and stearylamine or octadecylamine. These amines are valuable products either in themselves or as intermediates in the manufacture by known processes of their different derivatives, such as alcohols, amides, urethanes, isocyanates and the like. The invention is equally applicable to any organic compound of the molecule of which contains one or more nitrile groups and includes mono or polyaliphatic, aromatic or araliphatic nitriles, containing any number whatever of carbon atoms; in the case of polynitriles it is possible by interrupting the hydrogenation at the desired point to obtain products containing at the same time one or more nitrile groups and one or more amino groups.

The following examples illustrate how the invention may be carried out, but it is obvious that the invention is in no way limited to the details given in these examples. The parts are by weight throughout.

*Example 1*

In a steel autoclave fitted with a stirring apparatus there are placed 100 parts of stearic nitrile obtained from commercial stearic acid, 400 parts of ethyl alcohol, 5 parts of active nickel and 6.6 parts of caustic soda lye of 36° Bé. (corresponding to 2 parts of NaOH). The material is heated to 60–65° C. and hydrogen is introduced into the autoclave to give a pressure of 20 atmospheres. The hydrogen is replaced pari passu with its absorption until absorption ceases, which requires less than ½ hour. The product is separated from the catalyst, the alkali neutralized and the liquid then submitted to distillation. After removal of the alcohol there is obtained 95 parts of primary bases, representing a yield of 93.5% of theory calculated as stearylamine.

By working in the same fashion, but without the presence of the caustic soda, the absorption of hydrogen requires about 2 hours and the yield of primary bases obtained is only 76 parts, or 75% of theory.

*Example 2*

By working in the same fashion with 100 parts of palmitic nitrile obtained from commercial palmitic acid, 400 parts of ethyl alcohol, 7.5 parts of active nickel and 6.6 parts of caustic soda lye of 36° Bé., the treatment of the final products yields 96 parts of primary base which corresponds to 94.5% of the theoretical yield. This reaction can be repeated a very large number of times by returning each time the catalyst used in the previous operation without adding any fresh catalyst thereto. When this is done there is observed neither any diminution of the yield nor any increase in the time required for the absorption of the hydrogen.

*Example 3*

100 parts of oleic nitrile, 400 parts of ethyl alcohol, 5 parts of active nickel and 6.6 parts of caustic soda lye of 36° Bé., are used. By carrying out the hydrogenation at 80–90° C. there is obtained by treatment analogous to that of the previous example, 94 parts of primary unsaturated bases, which represents 92.5% of theory. By working at 50–55° C. the absorption is a little slower, but there is obtained an approximately equal quantity of the saturated primary bases.

*Example 4*

In the same apparatus as that described in Example 1 there is placed 100 parts of stearic nitrile, 400 parts of ethyl alcohol, 5 parts of active nickel and 2 parts of hydrated barium hydroxide $Ba(OH)_2 8H_2O$. The hydrogenation is carried out as previously described at 60–65° C. When the absorption of hydrogen has ceased, the catalyst is separated and liquid is subjected to distillation, without neutralizing the baryta. After distilling off the alcohol there is obtained 94.5 parts of primary base.

*Example 5*

500 parts of stearic nitrile to which are added 25 parts of methyltriethylammonium hydroxide are subjected to hydrogenation in the presence of active nickel. The yield of primary base is 91% of theory, whereas under the same conditions but in the absence of quaternary base the yield is only 78%.

*Example 6*

In a suitable apparatus there is placed 1000 parts of adipic dinitrile, 800 parts of ethyl alcohol, 100 parts of active nickel and 4 parts of sodium hydroxide in the form of commercial soda lye of 36° Bé. It is heated to 60–65° C. and there is maintained in the apparatus a pressure of hydrogen of 20 atmospheres. The absorption of hydrogen ceases after 1½ hours. The reaction liquid is treated as indicated in Example 1 and there is obtained 992 parts of pure hexamethylene diamine corresponding to a yield of 92.5% of theory. Under the same conditions but in the absence of sodium hydroxide the absorption of hydrogen only ceases after 2½ hours and there is only obtained 590 parts of hexamethylene diamine, which represents a yield of 55% of the theoretic.

*Example 7*

The process is carried out in the way described in Example 6, but the 100 parts of active nickel are replaced by 100 parts of active cobalt. In the presence of the sodium hydroxide the yield amounts to 91.5%, whereas in the absence of the soda, it is only 80%.

Example 8

Benzonitrile to which is added 1% of sodium hydroxide is subjected to hydrogenation in the presence of active nickel. Benzylamine is obtained with an almost theoretical yield. In the absence of sodium hydroxide the yield of primary amine is much lower and secondary and tertiary amines are formed.

Example 9

Benzylcyanide to which are added 1% of potassium hydroxide and 10% of active nickel is subjected to hydrogenation in alcoholic solution. The yield of pure beta-phenylethylamine is 25% higher than in absence of alkali. The catalyst may be reused a very large number of times.

Example 10

1600 parts of 2-methyl-4-amino-5-cyanpyrimidine, 6500 parts of ethyl alcohol, 90 parts of active nickel, 200 parts of caustic soda lye corresponding to 60 parts of NaOH, are agitated in an atmosphere of hydrogen at a temperature of 60° C. and under a pressure of 10 atmospheres.

When the absorption of hydrogen has ceased, the catalyst is separated and the alcohol evaporated; the liquid residue is then concentrated after acidifying with dilute hydrochloric acid. 2000 parts of pure 2-methyl-4-amino-5-aminomethyl-pyrimidine dichlorhydrate, free from secondary base are so obtained in crystalline form.

By operating in the absence of NaOH the yield is lower and the dichlorhydrate impure, especially because an appreciable amount of secondary bases is present, the separation of which is very difficult.

Example 11

The process is carried out in the same way as described in Example 6, but the operation is stopped before the absorption of hydrogen has ceased. There is so obtained with an excellent yield a mixture of ε-amino-capronitrile and hexamethylenediamine. There is formed neither secondary nor tertiary amines so that both reaction products can be easily separated by fractionating.

By reducing further the amount of absorbed hydrogen, there is obtained mixtures of unreacted adipic dinitrile and amino-capronitrile which may further contain hexamethylenediamine. Such mixtures can be easily fractionated.

By working according to this example, pressures lower than 20 atmospheres can advantageously be used.

Example 12

A solution of 250 parts 1,4-di(cyanomethyl)benzene in 600 parts of ethyl alcohol is subjected to catalytic hydrogenation in the presence of 25 parts of active nickel and 7.5 parts of caustic soda lye of 36° Bé. under a pressure of 15 atmospheres and at a temperature of 65° C. There is so obtained 1,4-di(aminoethyl)benzene, which boils at 153-154° C. under 11 mm. pressure and melts at 30° C.

If hydrogenation is stopped after half of the theoretical amount of hydrogen for the formation of the diamine has been absorbed, there is obtained in an excellent yield as hydrogenation product a mixture of diamine and aminonitrile, in the approximate ratio 1:2.

1-cyanomethyl-4-aminoethylbenzene is a colourless liquid boiling at 178-180° C. under 11 mm. pressure.

I claim:

1. A process for the manufacture of hexamethylenediamine by liquid phase catalytic hydrogenation of adipic dinitrile which comprises subjecting the liquid adipic dinitrile to catalytic hydrogenation at a temperature below 100° C. and in the presence of a concentrated aqueous solution of a strong base, the amount of said strong base which is present being from about 0.1% to about 10% of the weight of the said adipic dinitrile employed.

2. A process according to claim 1 in which the strong base used is an alkali metal hydroxide.

3. A process according to claim 1 in which the strong base used is barium hydroxide.

4. A process according to claim 1 in which the strong base used is a quaternary ammonium hydroxide.

5. A process according to claim 1 in which the catalytic hydrogenation is carried out by means of an active cobalt hydrogenation catalyst.

6. A process according to claim 1 in which the catalytic hydrogenation is carried out by means of an active nickel hydrogenation catalyst.

7. A process according to claim 1 in which the nitrile is dissolved in an inert solvent for the process of hydrogenation.

8. A process for the manufacture of hexamethylene diamine by liquid phase catalytic hydrogenation of adipic dinitrile which comprises heating the adipic dinitrile to a temperature of about 60° to 65° C. at a pressure of hydrogen of about 20 atmospheres in the presence of active nickel as the hydrogenation catalyst, ethyl alcohol as an inert solvent, and a strong aqueous solution containing about 4 parts of sodium hydroxide per 1000 parts of adipic dinitrile employed.

MAXIMILIEN GRUNFELD.

REFERENCES CITED

The following references are of record in the file of this patent:

UNITED STATES PATENTS

| Number | Name | Date |
| --- | --- | --- |
| 2,160,578 | Schmidt | May 30, 1939 |
| 2,166,152 | Howk | July 18, 1939 |
| 2,166,971 | Schmidt et al. | July 25, 1939 |
| 2,287,219 | Young et al. | June 23, 1942 |

FOREIGN PATENTS

| Number | Country | Date |
| --- | --- | --- |
| 536,940 | Great Britain | June 3, 1941 |